United States Patent
Hulle et al.

[15] 3,693,024
[45] Sept. 19, 1972

[54] ROTATIONAL SHAFT ENCODER HAVING A BEARING TUBE HAVING A SLOT THEREIN

[72] Inventors: Robert M. Hulle, Calabasas; Jerry L. Steward, Simi; Merle D. Borman, Tarzana, all of Calif.

[73] Assignee: Litton Systems, Inc., Beverly Hills, Calif.

[22] Filed: May 17, 1971

[21] Appl. No.: 144,073

[52] U.S. Cl............250/231 SE, 250/233, 340/347 P
[51] Int. Cl............................G01d 5/34, G01d 5/36
[58] Field of Search........340/347 P; 250/231 SE, 233

[56] References Cited

UNITED STATES PATENTS 2,733,008   1/1956   D'Andrea et al........340/347 P
3,588,887   6/1971   Landy, Jr................340/347 P Primary Examiner—James W. Lawrence
Assistant Examiner—T. N. Grigsby
Attorney—A. C. Rose, W. R. Thiel, H. E. Gillmann and A. B. Levine

[57] ABSTRACT

A rotational shaft encoder having two encoder discs mounted to rotate at different speeds in a preselected ratio determined by a gear train where the transmission of motion from an input shaft, carrying the high-speed encoder disc, to a low-speed encoder disc. The low-speed encoder disc is mounted on a bearing tube which houses the input shaft and is driven by a gear train which extends through a slot in the bearing tube to mesh with a gear integrally mounted on the input shaft.

12 Claims, 4 Drawing Figures

ROBERT M. HULLE
MERLE D. BORMAN
JERRY L. STEWARD
INVENTORS.

BY Harold E. Gillmann

ATTORNEY

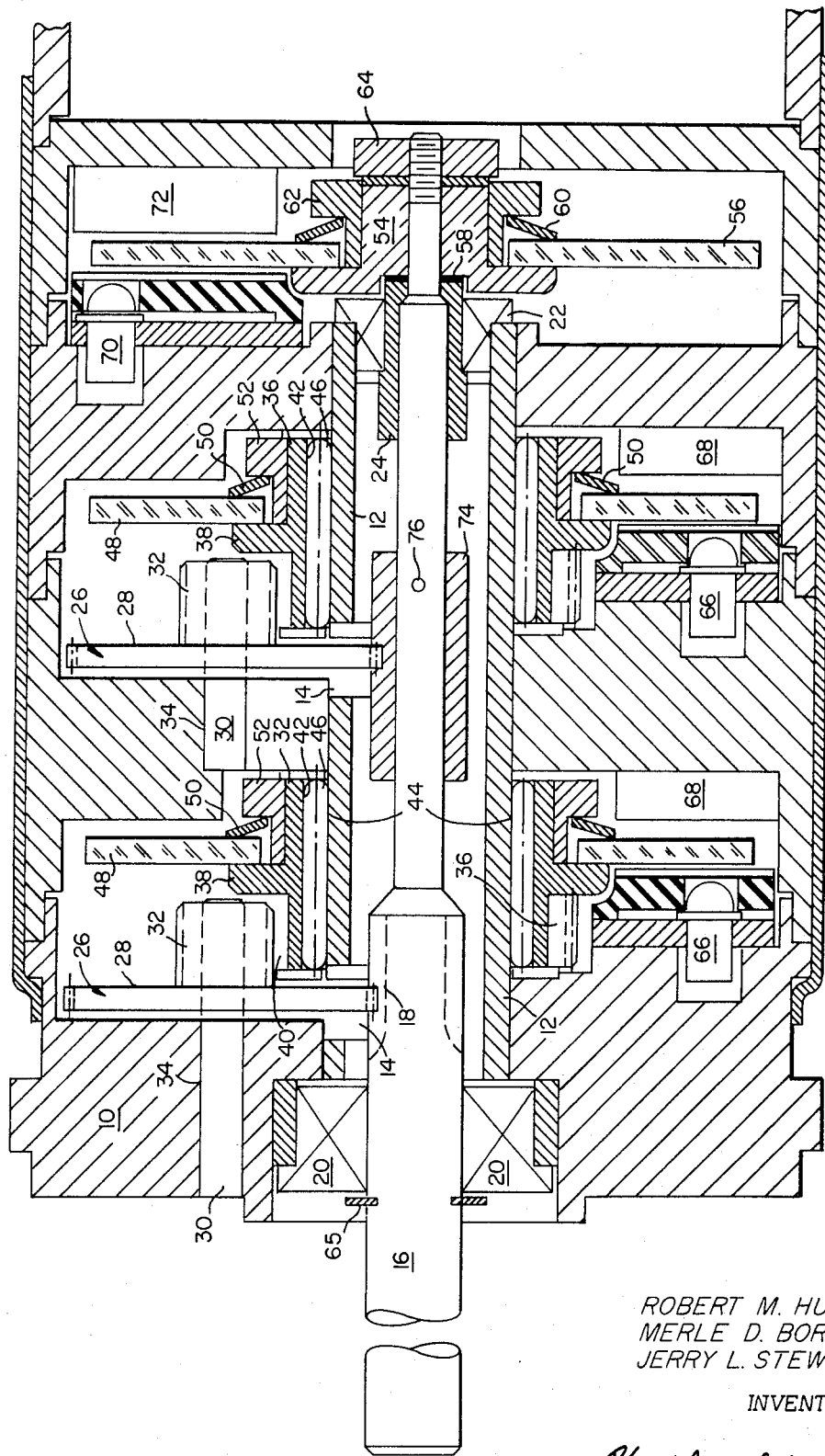

ROTATIONAL SHAFT ENCODER HAVING A BEARING TUBE HAVING A SLOT THEREIN

BACKGROUND OF THE INVENTION

This invention pertains to the art of fabricating rotational shaft encoders.

Many shaft encoders of the prior art utilize a high-speed encoder disc mounted on an input shaft which is supported by a pair of closely spaced bearings and a low-speed encoder disc which is mounted on a separate shaft driven by a gear train connected to the input shaft. Such encoders are subject to several disadvantages. Use of such an encoder in an electromechanical servo system, for example, may subject the encoder to side loads and end loading which limits the life and accuracy of the assembly. A gear mounted on the input shaft of such an encoder and connected in a gear train will be subjected to forces acting in radial directions as the gear train starts to rotate. Because the bearings supporting the input shaft are mounted close together with respect to the distance from a gear mounted on the input shaft to the front bearing, such an encoder may experience run-out, i.e., wobble, and radical compliance, i.e., the outer line of the shaft is radially displaced. In an encoder run-out and radial deflection of the input shaft due to such forces may tilt the encoder disc mounted on the input shaft so that the sensors gouge the disc.

SUMMARY OF THE INVENTION

The above and other disadvantages of shaft encoders of the prior art are overcome by the shaft encoder of the invention which provides a bearing tube having at least one slot therein for supporting at least one low-speed encoder disc rotatably mounted on the tube and for housing an input shaft having a high-speed disc directly coupled thereto. The low-speed encoder disc is driven by a gear assembly which extends through the slot in the bearing tube and meshes with a gear mounted on the input shaft. A portion of the external surface of the bearing tube functions as the inner race of a bearing which supports the low-speed encoder disc and associated mount. Bearings supporting the input shaft can be spaced to provide adequate support of the input shaft and to assure minimum run-out and minimum radial compliance. The distance between the earings is normally greater than the length of the shaft extension. The use of the bearing mounting tube provides for accurate support of the bearings supporting the input shaft and permits parallelism and run-out requirements to be achieved readily and repetitively. The shaft encoder of the invention has the additional advantage of lower breakaway torque and running torque sensitivity, hysterisis, and lower servo power requirements compared with shaft encoders of the prior art. More than one low-speed encoder disc may be coaxially mounted on the same bearing tube and driven by the same input shaft through a corresponding slot in the tube.

It is, therefore, an object of the invention to provide a rotational shaft encoder which utilizes a bearing tube for spacing bearing supporting an input shaft to avoid run-out and radial compliance by the input shaft.

It is another object of the invention to provide a rotational shaft encoder which utilizes a bearing tube having a slot therein which permits a low-speed encoder disc rotatably mounted on the bearing tube to be driven by a gear assembly extending through the slot in the bearing tube to mesh with a gear mounted on the input shaft.

It is yet another object of the invention to provide a shaft encoder having a bearing tube for supporting a plurality of encoder discs each of which is driven by the same input shaft at a different reduced speed.

It is a further object of the invention to provide a rotational shaft encoder which utilizes a pair of encoder discs and which has minimum size.

DESCRIPTION OF THE DRAWINGS

These and other objects and advantages of this invention will become apparent from the following description taken in accordance with the specifications and constructed in conjunction with the accompanying drawings throughout, in which like reference characters indicate like parts and in which:

FIG. 4 is a cross-sectional view of another embodiment of the invention having a plurality of encoder discs rotatably mounted on the same bearing tube.

DETAILED DESCRIPTION OF THE PREFERRED EMBODIMENTS

Figure 1:
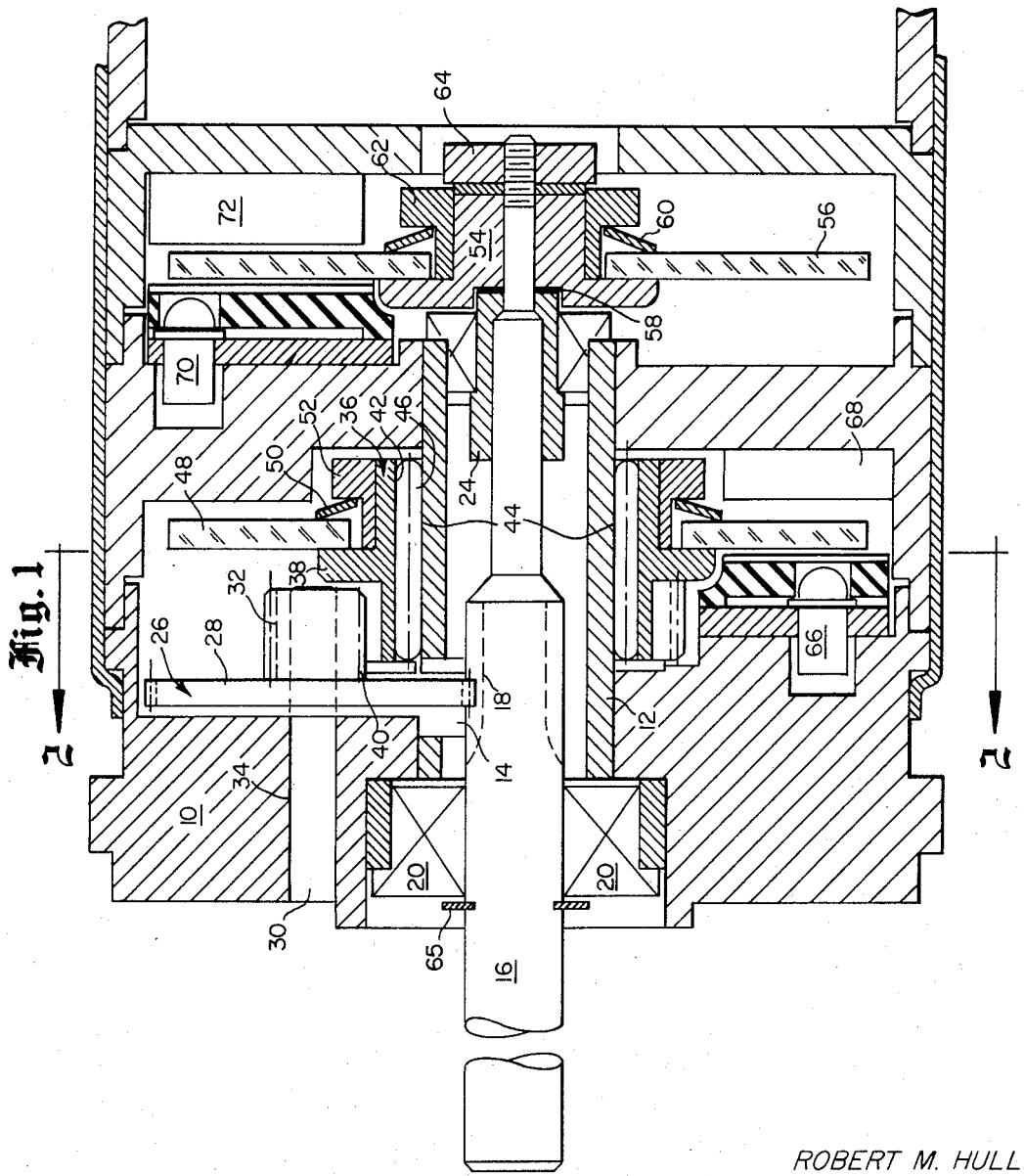
FIG. 1 is a cross-sectional view of a rotational shaft encoder.
Figure 2:
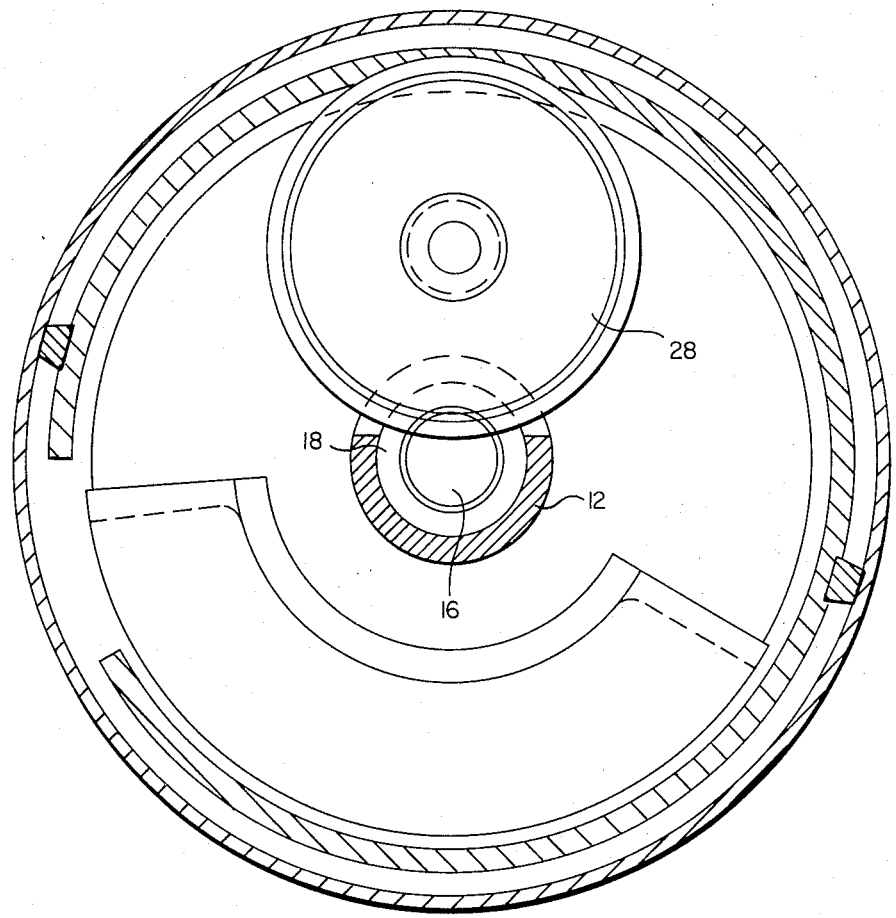
FIG. 2 is a cross-sectional view of the shaft of FIG. 1 taken at section line 2–2.

In FIGS. 1 and 2 a gearbox 10 is shown. One end of bearing tube 12 is rigidly affixed to gearbox 10. Bearing tube 12 has a lateral slot 14.

An input shaft 16 which has a pinion gear 18 as an integral part hereon is inserted in bearing tube 12 so that pinion gear 18 is in juxtaposition with slot 14. Pinion gear 18 may be hobbed on shaft 16. Input shaft 16 is supported by ball bearings 20 and 22.

Preferably bearings 20 and 22 are separated by distance in the order of at least five to six times the diameter of input shaft 16. A gear (not shown) in an associated mechanism such as a servo train may be fitted on the end of input shaft 16. The ratio of the distance from the center line of such a gear to bearing 20 to the distance between bearings 20 and 22 should be in the order of one-half for minimum run-out and radial compliance. Sleeve 24 is threaded on input shaft 16 and is in turn supported by bearing 24.

Pinion gear 18 drives one gear assembly 26 which is comprised of a spur gear 28, pin 30 and pinion gear 32.

One spur gear 28 extends through slot 14 and meshes with pinion gear 18 on input shaft 16. Spur gear 28, pin 20 and pinion gear 32 are an integral unit in the preferred embodiment and rotate together as pin 22 turns in socket 34 in gearbox 10. Pinion gear 18 and its corresponding spur gear 28 have a predetermined gear ratio for reducing the speed of rotation of spur gear 28.

Pinion gear 32 drives a corresponding spur gear means 36 which is comprised of a mount 38 having a spur gear 40 mounted thereon and an inner cylindrical surface which is utilized as an outer bearing race 42. Bearing tube 12 is inserted through spur gear means 36 so that the teeth of gears 32 and 40 mesh. Each spur gear 40 and corresponding pinion gear 32 also have a predetermined gear ratio for reducing the rotational speed of spur gear 40. In addition to providing support for both end bearings 20 and 22, a portion of the external surface of bearing tube 12 is juxtaposition with outer bearing race 42 acts as an inner bearing race of a bearing for supporting spur gear means 36. A plurality of needle bearings 46 are positioned between the outer and inner bearing races 42 and 44 to provide support and precision alignment for spur gear means 36. Spur gear means 36 including mount 38 is coaxially aligned with respect to input shaft 16.

Encoder disc 48 may be a conventional glass commutator disc having a plurality of tracks comprising alternate clear and opaque segments for encoding incident light beam. Encoder disc 48 is supported on mount 38 to rotate therewith and it is held in place by Bellville washer 50 and retainer ring 52. Bellville washer 50 urges encoder disc 48 against mount 38 to maintain encoder disc 48 orthogonal to the longitudinal axis of input shaft 16. Encoder disc 48 is also coaxially mounted with respect to input shaft 16 and rotates at a reduced speed with respect to input shaft 16 in accordance with the predetermined gear ratios of pinion gear 18, spur gear 28, pinion gear 32 and spur gear 40.

Mount 54 fits directly over input shaft 16 for supporting a second, high-speed, encoder disc 56. Shim 58 is positioned between mount 56 and sleeve 24 to facilitate the rotation of mount 54. Encoder disc 56 is mounted in a manner similar to that of encoder disc 48. Bellville washer 60 urges encoder disc 56 into an orthogonal position with respect to input shaft 16. Bellville washer 60 is held in place by a retainer ring 62 and nut 64. Nut 64 is threaded on the end of input shaft 16. Retainer ring 65 provides a shoulder on shaft 16 for tightening nut 64. Encoder disc 56 is mounted coaxially with respect to input shaft 16 and rotates at the same speed as input shaft 16.

Light source 66 continuously illuminates a portion of encoder disc 48. Light source 66 may be a gallium arsenide diode which is forward biased to the light emitting region. Light source 66 is mounted on gearbox 10. A beam of light from light source 66 is projected across the tracks of encoder disc 48.

Light sensor 68 is mounted on gearbox 10 on the opposite side of encoder disc 48 from light source 66. Light sensor 68 receives and detects light signal commutated by encoder disc 48 as it rotates. Light sensor 68 produces at least one output signal for each track of encoder disc 48. The signals corresponding to each track of the encoder disc 48 may also be amplified by a plurality of amplifiers included as integral part of light sensor. 68.

For purposes of increasing the accuracy of the encoder, the light beam from light source 66 may be passed through a slit (not shown) located either on the light source or between the light source and the encoder disc for narrowing the light beam to a width in the order of 15 minutes of arc.

Light source 70 and light sensor 72 are located on opposite sides of encoder disc 56 and are similar to light source 66 and light sensor 68 respectively.

In operation, the analog information to be encoded is transmitted to the encoder via input shaft 16. Input shaft is directly coupled to the high-speed encoder disc 56. As encoder disc 56 rotates with input shaft 16, the light beam from light source 70 is commutated by the clear and opaque segments of each track of encoder disc 56. Light sensor 72 detects the commutated light beam and produces output signals corresponding to each track on encoder disc 56 which are an indication of the angular position of encoder disc 56.

Each low-speed encoder disc 48 is coupled to input shaft 16 via gear assembly 26 and gear means 36 which effect a speed reduction in accordance with a predetermined design ratio. In accordance with the invention a pinion gear on the input shaft 16, for example, pinion gear 18 drive spur gear 28 which meshes with the pinion gear through slot 14 in bearing tube 12. Light source 66, light sensor 68 and rotating encoder disc 48 operate in a manner similar to that of light source 70, light sensor 72 and encoder disc 56 is described above. The output signals from light sensor 68 are a measure of the angular position of encoder disc 48.

Figure 3:
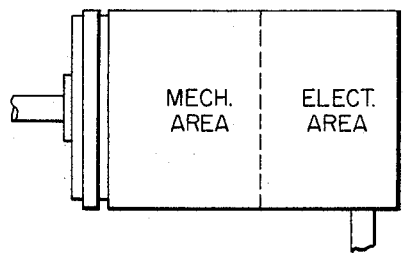
FIG. 3 is a cross-sectional view of a rotational shaft encoder having an associated electronics network integrally mounted thereon.

In FIG. 3 there is shown a block diagram of a rotational shaft encoder having associated electronics integrally packaged with the mechanical portion of the encoder.

Multiple encoder discs 48 each rotatably mounted on the same bearing tube 16 illustrated in FIG. 4. One of the pair of encoder discs 48 is driven by a pinion gear 18 in the manner discussed above. The other encoder disc 48 is driven by a corresponding spur gear means 36 driven by a corresponding gear assembly 26 which is in turn driven by pinion gear 74. Pinion gear 74 may be formed as a separate gear and fixed in place on shaft 16 by a pin 76. Where multiple encoder discs 48 are utilized, they will be probably be driven at different speeds by varying the predetermined gear ratios discussed above. Both encoder discs 48 of the embodiment shown in FIG. 4, and the associated light sensors, detector and amplifiers of each operate in the manner discussed above.

While a preferred embodiment of this invention has been herein illustrated, it will be appreciated by those skilled in the art that other variation in the disclosed arrangements, both as to their details and as to the organization of such details may be made without departing from the spirit and scope hereof. For example, the novel bearing arrangement of the invention may be used in a pin encoder equally well as in an optical encoder. Accordingly, it is intended that the foregoing disclosure and the showings make in the drawings shall be considered only as illustrative of the principles of this invention and not construed in a limited sense.

We claim:
1. A shaft encoder comprising:
   a. a frame;
   b. a bearing tube having a slot therein, said bearing tube having at least one end rigidly connected to said frame;
   c. a rotatable input shaft coaxially mounted in said tube, said input shaft including a pinion gear in juxtaposition with said slot in said tube;
   d. a first spur gear means rotatably mounted on said bearing tube;
   e. a gear assembly mounted on said frame, said gear assembly engaging said first pinion gear through said slot and engaging said first spur gear means for driving said first spur gear means at a speed which is a preselected ratio of the speed of said input shaft; and f. a first encoder disc mounted on said first spur gear means to rotate therewith; said encoder disc being coaxially aligned with said input shaft.

2. The device as claimed in claim 1 and further including a pair of bearings mounted near each end of said tube for supporting said input shaft.

3. The device according to claim 2 wherein each said bearing of said pair is separated from the other bearing of said pair by a distance in the order of five times the diameter of the input shaft for minimizing run-out and radial compliance.

4. The device as claimed in claim 1 wherein said gear assembly comprises a second spur gear and a second pinion gear mounted on said frame to rotate together, said second spur gear extending through said slot and meshing with said first pinion gear, said second pinion gear meshing with said first spur gear for driving said first spur gear and said first encoder disc.

5. The device as claimed in claim 1 wherein said input shaft protrudes from both ends of said tube a predetermined distance and further including a second encoder disc coaxially mounted on one end of said input shaft to rotate therewith.

6. The device as claimed in claim 1 wherein the surface areas of said first spur gear means and said tube which are in juxtaposition comprise the outer and inner races of a bearing respectively and further including a plurality of needle bearings positioned between said races for supporting said first spur gear means and said first encoder disc in coaxial alignment with said input shaft.

7. The device as claimed in claim 5 and further including a first and a second light source illuminating each encoder disc and a first and a second light detector means for detecting light signals commutated by each encoder disc.

8. The device as claimed in claim 7 wherein each said light source is a gallium arsenide diode.

9. The device as claimed in claim 7 and further including first and second amplifier means for amplifying light signals detected by said first and second light detector means respectively.

10. The device as claimed in claim 9 wherein said shaft encoder and said amplifier means are integrally mounted in one housing.

11. A shaft encoder comprising:
a. a frame;
b. a bearing tube having a plurality of slots therein, said bearing tube having at least one end rigidly connected to said frame;
c. a rotatable input shaft coaxially mounted in said tube, said input shaft including a pinion gear in juxtaposition with each said slot in said tube;
d. a plurality of spur gear means rotatably mounted on said bearing tube;
e. a plurality of gear assemblies mounted on said frame, one gear assembly therefrom engaging each said pinion gear through a corresponding slot and engaging a corresponding spur gear means for driving said corresponding spur gear means at a speed which is a preselected ratio of the speed of said input shaft; and
f. a plurality of encoder discs, one therefrom mounted on each said spur gear means to rotate therewith, each said encoder disc being coaxially aligned with said input shaft.

12. The device as claimed in claim 11 and further including a light source illuminating each said encoder disc of said plurality of encoder discs and a light detector means corresponding to each said encoder disc for detecting light signals commutated by each said corresponding encoder disc.

* * * * *